Figure 1:
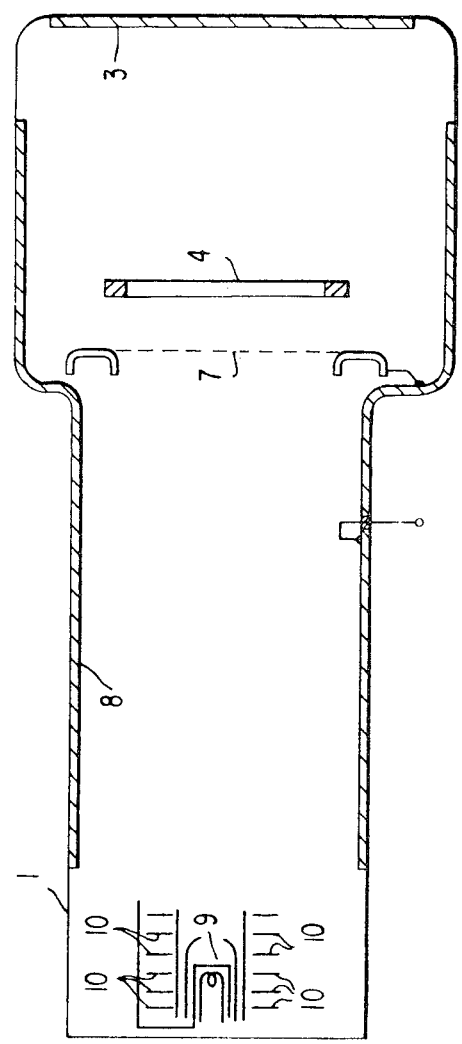

United States Patent

[11] 3,584,251

[72] Inventors Peter Baldwin Banks, Rawreth, and
 Hans Scholz, Great Baddow, England
[21] Appl. No. 867,436
[22] Filed Oct. 16, 1969
[45] Patented June 8, 1971
[73] Assignee English Electric Valve Company Limited,
 Strand, London, England
 Continuation-in-part of application Ser. No.
 580,361, Sept. 19, 1966
[32] Priority Sept. 29, 1965
[33] Great Britain
[31] 41,456/65

[54] CAMERA TUBE HAVING GLASS MEMBRANE WITH LAYER OF MAGNESIUM OXIDE AND NICKEL OXIDE
3 Claims, 1 Drawing Fig.

[52] U.S. Cl. ........................................ 313/65T, 313/68
[51] Int. Cl. ................................................ H01j 31/26, H01j 31/36, H01j 29/41
[50] Field of Search ...................................... 313/65, 67, 65T

[56] References Cited
UNITED STATES PATENTS
2,518,434 8/1950 Lubszynski.
2,587,830 3/1952 Freeman.
3,179,834 4/1965 Ochs.
3,202,854 8/1965 Ochs.
3,258,434 6/1966 Mackenzie et al........ 313/65T
3,308,324 3/1967 Van Asselt.............. 313/65
3,405,309 10/1968 Goetze et al............ 313/67X
FOREIGN PATENTS
879,569 10/1961 Great Britain. 313/65A Primary Examiner— Robert Segal
Attorney— Baldwin, Wight, Diller & Brown ABSTRACT: Television camera cathode ray tubes of the image orthicon type having a thin, glass charge storing member with a very thin layer of metal oxide deposited thereon. The coating of metal oxide on the charge storing or target member greatly reduces the disadvantageous effects of the depositing of alkali metals on the charge storing member during the formation of the tube. The method of applying metal oxide to the charge storing member includes the formation of a pellet containing a powdered mix and bombarding the pellet with an electron beam to produce coatings by evaporation of the pellet in vacuo until the required coating thickness is reached.

PATENTED JUN 8 1971

3,584,251

Inventors:
Peter Baldwin Banks
and
Hans Scholz
BY
Baldwin Wight Keller & Brown
ATTORNEYS

CAMERA TUBE HAVING GLASS MEMBRANE WITH LAYER OF MAGNESIUM OXIDE AND NICKEL OXIDE

This is a streamline continuation of 580,361, filed Sept. 19, 1965, now abandoned.

This invention relates to television camera cathode ray tubes and more specifically to image orthicon tubes of the kind in which a pattern of electric charges is produced by means of a photo-cathode exposed to a subject of transmission on and stored by a thin glass film membrane which is scanned by a scanning cathode ray to neutralise the charges and develop picture signals.

In manufacturing image orthicon tubes of all kinds there is employed a photo-cathode forming exhaustion step during which considerable quantities of caesium and/or other alkali metals are vaporized inside the envelope. The introduction of such alkali metals is required, as is well known, in the processing of the photo-cathode material used in the tube. Inevitably some of the alkali metal condenses on to the surface of the target structure of the tube. In the case of an image orthicon tube of the kind in which the target structure comprises a glass support member with a transparent metal signal plate (through which an optical image of a subject of transmission is projected) on one side and on the other side a mosaic of discrete conductive elements coated on the faces thereof remote from the glass support with photosensitive material, such condensed alkali metal provides partially short circuiting conductive paths between the mosaic elements. This defect can be, as is known, overcome in this type of image orthicon tube by depositing an insulating layer of metallic oxide, such as magnesium oxide, directly on the face of the glass support remote from the signal plate and forming the photo-sensitive coated mosaic elements on this layer which is, in practice, thick enough to reduce the light passing through to the photo-sensitive deposits by some 50% or 60%.

In the case of an image orthicon tube of the kind to which this invention relates, i.e. the kind in which the target structure is not itself photo-sensitive, there is no mosaic of discrete elements or glass support, but instead a glass membrane which itself acts as a device storing a charge image, produced by a separate photo-cathode, of a subject of transmission, the deposition of caesium or other alkali metal produces a result which though of the same general nature as that produced by such deposition on the target of a tube of the photo-sensitised mosaic type in that it produces conductive paths through which stored charges can leak, is much more serious because the alkali deposition is in direct shunt with the entire surface of the charge storing glass membrane. Moreover there is the difficulty that the membrane itself has to receive the electron image of a subject of transmission from the separate photo-cathode. The present invention seeks to overcome these difficulties.

According to this invention an image orthicon tube of the kind having an electrical charge storing member in the form of a thin glass membrane which when the tube is in use receives a high speed electron image of a subject of transmission from a photo-cathode and is scanned by a cathode ray to develop picture signals is provided, deposited on the face of said membrane towards said photo-cathode, with a very thin layer mainly of metal oxide of such small thickness as to be substantially transparent to the high speed electrons from said photo-cathode.

According to a feature of this invention an image orthicon tube of the kind having an electrical charge storing member in the form of a thin glass membrane which when the tube is in use receives a high speed electron image of a subject of transmission from a photo-cathode and is scanned by a cathode ray to develop picture signals is provided, deposited on the face of said membrane towards said photo-cathode, with a very thin layer mainly of metal oxide of between 25 and 60 angstroms thick. Preferably the thickness of the metal oxide layer is between 30 and 50 angstroms.

The deposited metal oxide is preferably mainly MgO though other caesium resistant metals may be used.

It has been found, rather surprisingly, that even so thin a deposited layer as one which does not seriously obstruct the high speed electrons from the photo-cathode—e.g. a layer only (say) 40 angstroms thick—is in fact sufficient greatly to reduce if not completely avoid the disadvantageous effects which would occur from caesium deposited on the glass membrane if the oxide layer were not present to prevent it.

The thickness of the deposited oxide layer required for best results is comparatively critical. In experimental testing with a typical image orthicon tube of the kind referred to, excellent results were obtained with a deposit of MgO 40 Å thick. When the thickness of the deposit was increased to 50 Å or decreased to 30 Å, markedly poorer results were obtained and when the thickness increased to 60 Å or reduced to 25 Å the results became very much poorer.

The explanation of the success of the invention is not fully and certainly understood. It is known however that the resistivity of a very thin deposit depends, amongst other things upon the nature of the support upon which the deposit is made and, while the invention is not dependent upon the correctness and sufficiency or otherwise of the explanation now to be advanced, it is believed that the explanation of the substantial improvement which in fact the invention achieves is that the resistivity of the deposit of alkali metal produced as an inevitable concomitant of the vaporization of that metal during the exhausting and photo-cathode forming step of manufacture, is substantially higher when the metal is deposited on the very thin layer of metal oxide on the glass membrane than it would be if it were deposited directly on that membrane.

A metal oxide layer of the range of thickness above stated is easily penetrated by the high velocity electrons from the photo-cathode of an image orthicon tube of the kind to which the invention relates. It is, however, generally desirable to provide a layer of metal oxide on both faces of the glass membrane but, if this is done, it is not satisfactory to make the layer entirely of MgO because such a layer, present on the side of the membrane facing towards the scanning electron gun, would be, although thin, not sufficiently transparent to the relatively slow speed electrons from the said gun and severe "sticking" would result.

Preferably therefore, in carrying out this invention, the glass membrane is provided on both sides with a layer consisting mainly of MgO to which a small proportion of metal oxide of definite but limited conductivity has been added. A preferred composition for a layer provided on both sides of the glass membrane is approximately 90% by weight of MgO and approximately 10% by weight of conductive oxide, preferably NiO. The proportions of MgO and conductive metal oxide may be varied between fairly wide limits to suit requirements but preferably the limits are 5% and 33.3% by weight of the conductive metal oxide. NiO is the at present preferred conductive oxide, but an oxide of Cr, Mn, Fe or Co may be used, or there may be employed a mixture selected from the oxides of Cr, Mn, Fe, Co and Ni.

A preferred method of carrying out the present invention is as follows:

(1) Carbonates of Mg and Ni (or whatever metal or metals is or are to be used to provide the conductive oxide to be mixed with MgO) are weighed out in the required proportions and intimately mixed by grinding in a ball mill;

(2) The ball-milled powder is pressed into pellets of suitable shape and size. Disc-like pellets about ½" diameter and 9/16" thickness are convenient. The pellets are fired at about 1000°C at which temperature the carbonates are broken down to oxides and a rather soft ceramic results;

(3) Glass membranes to be treated are coated in vacuo with the oxide mixture by evaporation produced by bombarding a sintered pellet by an electron beam focussed thereon. The thickness of the layer thus produced on the membrane by evaporation is monitored during the evaporation step, by at the same time also depositing the evaporated material on to a quartz crystal the frequency of which is continuously observed. The evaporation step is halted when the crystal reaches a predetermined frequency found, by previous trial and error experiment, to be reached when deposition has continued to the point at which a layer of the required thickness has been obtained on the membranes under treatment; and (4) The treated glass membranes are mounted in their respective tubes and the normal known processes of tube manufacture, including the exhaustion step with vaporization of alkali metal to form the photo-cathode, are continued.

In the drawings:

FIG. 1 is a schematic illustration of an image orthicon tube having a charge storing membrane to be treated in accordance with the present invention; and FIG. 2 is a schematic illustration of the image section of an image orthicon tube and shows a glass, charge storing membrane having layers of metal oxide coated thereon.

The image orthicon tube of FIG. 1 consists of an evacuated envelope 1 having a photo-cathode 3 mounted on the end wall of the envelope 1. The image orthicon tube further includes a glass membrane target or charge storing member 4, a field terminating mesh 7, a wall anode 8, an electron gun 9, and a dynode system 10. The image orthicon tube of FIG. 1 is exemplary of the type of tube into which the subject matter of the present invention may be incorporated and it is not intended in any way to be definitive of all such tubes incorporating the subject matter of the present invention.

The image section end of an image orthicon tube embodying the present invention is more clearly shown in FIG. 2. The tube comprises the glass envelope 1 of enlarged diameter over the image section 2 enclosing the photo-cathode 3. Spaced from the photo-cathode 3 is the thin glass membrane target 4 and interposed between the target 4 and the photo-cathode 3 is the customary screen 5 and accelerating electrode 6. As so far described, the tube is as well known per se. In accordance with the present invention the thin glass membrane target 4 has deposited on both sides, to a thickness of 40 angstroms, a layer having a composition of approximately 90% by weight of magnesium oxide and 10% by weight of nickel oxide.

Image orthicons of the kind referred to and in accordance with this invention have been found experimentally not only to have materially better resolution than comparable known tubes but to manifest a significant improvement in transfer characteristic, there being little or none of the undesirable over-exposure effect known as "white-crushing" (loss of discrimination in the brighter picture areas) so often exhibited by known image orthicons as at present in common use. Also such improved tubes have improved sensitivity and there are indications that the signal-to-noise ratio is somewhat improved.

We claim:

1. An image orthicon tube including a photocathode; an electrical charge storing member in the form of a thin glass membrane, said member being so positioned that when the tube is in operation it receives an electron image of a subject of transmission from said photocathode; scanning means including an electron gun and electrodes to which accelerating potentials may be applied adapted and positioned to scan said member with a cathode ray to develop picture signals characterized in that said electrical charge storing member consists of a thin glass membrane having deposited on the face thereof towards said photocathode a very thin layer of magnesium oxide containing from about 5 to 33.3 percent by weight of nickel oxide, said layer having a thickness of between 25 and 60 angstroms and being of such small thickness as to be substantially transparent to the electrons emitted by said photocathode.

2. A tube as claimed in claim 1 wherein the layer is between 30 and 50 angstroms thick.

3. A tube as claimed in claim 1 wherein the layer is deposited on both sides of the membrane.